(12) United States Patent
Armanini et al.

(10) Patent No.: US 8,468,803 B2
(45) Date of Patent: Jun. 25, 2013

(54) SOOT RESISTANT DIESEL FUEL REFORMER FOR DIESEL ENGINE EMISSIONS AFTERTREATMENT

(75) Inventors: Bret Robert Armanini, Dublin, CA (US); Jacques F. Nicole, Palo Alto, CA (US); David R. Sheridan, Menlo Park, CA (US); David Yee, West Bloomfield, MI (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 358 days.

(21) Appl. No.: 13/035,960

(22) Filed: Feb. 26, 2011

(65) Prior Publication Data
US 2012/0216514 A1    Aug. 30, 2012

(51) Int. Cl.
*F01N 3/00* (2006.01)
*F01N 3/10* (2006.01)
*B01D 50/00* (2006.01)

(52) U.S. Cl.
USPC ............................ 60/286; 60/299; 422/180

(58) Field of Classification Search
USPC ............ 422/177, 180; 60/286, 299; 428/593, 428/596, 597; 502/439
See application file for complete search history.

(56) References Cited

U.S. PATENT DOCUMENTS

| | | | |
|---|---|---|---|
| 4,576,800 A * | 3/1986 | Retallick | 422/180 |
| 4,665,051 A * | 5/1987 | Nonnenmann | 502/439 |
| 5,045,403 A | 9/1991 | Maus et al. | |
| 5,403,559 A * | 4/1995 | Swars | 422/180 |
| 5,599,509 A * | 2/1997 | Toyao et al. | 422/180 |
| 5,648,050 A * | 7/1997 | Matsumoto et al. | 422/180 |
| 6,087,298 A | 7/2000 | Sung et al. | |
| 6,316,121 B1 | 11/2001 | Maus | |
| 6,887,067 B2 * | 5/2005 | Griffin et al. | 431/7 |
| 7,240,483 B2 | 7/2007 | Cizeron et al. | |
| 7,267,805 B2 * | 9/2007 | Bruck et al. | 422/180 |
| 2004/0050037 A1* | 3/2004 | Betta et al. | 60/286 |
| 2004/0226217 A1 | 11/2004 | Ahmed et al. | |
| 2007/0028601 A1 | 2/2007 | Duvinage et al. | |
| 2007/0137187 A1 | 6/2007 | Kumar | |
| 2008/0022660 A1* | 1/2008 | Reuter et al. | 60/286 |
| 2008/0022662 A1* | 1/2008 | Yan | 60/286 |
| 2008/0072575 A1* | 3/2008 | Yan | 60/284 |
| 2009/0120072 A1* | 5/2009 | Dalla Betta et al. | 60/295 |
| 2011/0185708 A1* | 8/2011 | McCarthy et al. | 60/286 |

* cited by examiner

Primary Examiner — Tom Duong
(74) Attorney, Agent, or Firm — Paul V. Keller (57) ABSTRACT

A soot resistant and efficient diesel fuel reformer for a diesel exhaust aftertreatment system has serially arranged first and second catalyst supports. The first support is nearer the inlet and has a monolith structure that is uniform in the direction of flow. The second support has a modified monolith structure that is non-uniform in the direction of flow. Preferably, the first support has straight channels. Preferably, the second support has internal leading edges spaced periodically through its length to break up the flow. The first support has a catalyst coating comprising at least an oxidation catalyst. The second support has a catalyst coating comprising at least a steam reforming catalyst.

19 Claims, 3 Drawing Sheets

Fig. 5

SOOT RESISTANT DIESEL FUEL REFORMER FOR DIESEL ENGINE EMISSIONS AFTERTREATMENT

FIELD OF THE INVENTION

The present invention relates to diesel fuel reformers for diesel engine exhaust aftertreatment systems.

BACKGROUND

Diesel-fueled internal combustion engines are widely used to power vehicles such as medium and heavy duty trucks and have other applications as in emergency generators. Whereas gasoline engines use spark ignition, diesel engines use compression ignition. As a consequence, the composition of diesel engine exhaust is much different from that of gasoline engine exhaust. The major pollutants in gasoline engine exhaust are carbon monoxide, unburned hydrocarbons, and some $NO_X$. The major pollutants in diesel engine exhaust are $NO_X$ and particulate matter (soot). Gasoline engine exhaust aftertreatment systems have been widely used since the 1970s. Diesel engine exhaust aftertreatment systems have only recently come into widespread use.

Catalytic converters comprising three-way catalysts can effectively control emissions from conventional gasoline engines by oxidizing carbon monoxide and unburned hydrocarbons while simultaneously reducing $NO_X$. This approach is unsuitable for diesel engine exhaust because diesel exhaust contains from about 4 to 20% oxygen. The excess of oxygen and dearth of oxygen accepting species (reductants) makes catalytic converters ineffective for reducing $NO_X$ in diesel exhaust.

Several solutions have been proposed for controlling $NO_X$ emissions from diesel engines. One set of approaches focuses on the engine itself. Techniques such as exhaust gas recirculation and partially homogenizing fuel-air mixtures are helpful, but these techniques alone do not eliminate $NO_X$ emissions. Another set of approaches remove $NO_X$ from the exhaust. These include the use of lean-burn $NO_X$ catalysts, selective catalytic reduction (SCR) catalysts, and lean $NO_X$ traps (LNTs).

Lean-burn $NO_X$ catalysts promote the reduction of $NO_X$ under oxygen-rich conditions. Reduction of $NO_X$ in an oxidizing atmosphere is difficult. It has proven challenging to find a lean-burn $NO_X$ catalyst that has the required activity, durability, and operating temperature range. A reductant such as diesel fuel must be steadily supplied to the exhaust for lean $NO_X$ reduction, adding 3% or more to the engine's fuel requirement. Currently, the sustainable $NO_X$ conversion efficiencies provided by lean-burn $NO_X$ catalysts are unacceptably low.

SCR generally refers to selective catalytic reduction of $NO_X$ by ammonia. The reaction takes place even in an oxidizing environment. The $NH_3$ or $NO_X$ can be temporarily trapped and stored in an adsorbent with an exhaust system, or ammonia can be fed continuously to the exhaust. SCR can achieve high levels of $NO_X$ reduction, but there is a disadvantage in the lack of infrastructure for distributing ammonia or a suitable precursor. Another concern relates to the possible release of ammonia into the environment.

LNTs are devices that adsorb $NO_X$ under lean conditions and reduce and release the adsorbed $NO_X$ under rich conditions. An LNT generally includes a $NO_X$ adsorbent and a catalyst. The adsorbent is typically an alkali or alkaline earth compound, such as $BaCO_3$ and the catalyst is typically a combination of precious metals including Pt and Rh. In lean exhaust (exhaust containing an excess of oxygen and other oxidizing species in comparison to reducing compounds), the catalyst speeds reactions that lead to $NO_X$ adsorption. In a rich exhaust (containing reductants in excess of oxidizing compounds), the catalyst speeds reactions by which reductants are consumed and adsorbed $NO_X$ is reduced and desorbed. In a typical operating protocol, a rich condition (reducing environment) is created within the exhaust from time-to-time to regenerate (denitrate) the LNT.

In addition to accumulating $NO_X$, LNTs accumulate $SO_X$. Most fuels contain some sulfur and $SO_X$ is a byproduct of combusting sulfur-containing fuels. Even with low sulfur diesel fuels, the amount of $SO_X$ produced by combustion is significant. $SO_X$ adsorbs more strongly than $NO_X$ and necessitates a more stringent, though less frequent, regeneration under rich conditions. Desulfation requires elevated temperatures, e.g., 700° C.

The reducing environment for denitration or desulfation can be created in a variety of ways. One approach uses the engine to create a rich exhaust-reductant mixture. For example, the engine can inject extra fuel into the exhaust within one or more cylinders prior to expelling the exhaust. A disadvantage of this approach is that it can interfere with normal engine operation. Another approach is to inject reductant into the exhaust downstream from the engine.

With either approach a portion of the reductant is expended consuming excess oxygen in the exhaust. Rerouting a portion of the exhaust to bypass the LNT during regeneration reduces the required amount, but it is preferable to avoid the use of bypass lines and exhaust valves. A more acceptable approach to reducing the amount of excess oxygen and the amount of reductant required to reduce it is throttling the engine, at least under circumstances where such throttling does not have an adverse effect on engine performance.

Reductant reacts with excess oxygen in the exhaust to form combustion or partial combustion products. Preferably, the reactions take place upstream from the LNT in a fuel reformer. A fuel reformer is a device that catalyzes oxidation reactions in such a way as to favor the formation of partial combustion reaction products, especially CO and $H_2$. CO and $H_2$ are more effective than their precursors for regenerating LNTs. Fuel reformers are sometime placed outside of the exhaust line to provide reductant in the form of CO and $H_2$. It is preferable, however, for the fuel reformer to be configured within the exhaust line and to generate CO and $H_2$ while simultaneously eliminating excess oxygen from the exhaust.

WO 2004/090296 (hereinafter "the 296 publication") describes a diesel automotive exhaust treatment system with a fuel reformer configured within an exhaust line upstream from LNT and SCR catalysts. The reformer removes excess oxygen from the exhaust while converting diesel fuel into more reactive reformate. In that system, the fuel reformer is combined into a diesel particulate filter. The combination reformer-particulate filter has a high thermal mass and must perform its reforming function at exhaust gas temperatures. This requires a relatively large amount of precious metal catalyst. The combination fuel reformer-particulate filter is heated over an extended time interval on a periodic basis in order to remove accumulated soot.

U.S. Pat. Pub. No. 2004/0050037 (hereinafter "the '037 publication") describes a different type of fuel reformer for placement in an exhaust line upstream from an LNT. The '037 reformer includes both oxidation and steam reforming catalysts. Pt and/or Pd serves as the oxidation catalyst. Rh serves as the reforming catalyst. The inline reformer of the '037 publication is designed for rapid heating and then catalyzing steam reforming. Temperatures from about 500° C. to about 700° C. are required for effective function of this reformer. These temperatures are substantially higher than typical diesel exhaust temperatures. The reformer is heated by injecting fuel at a rate that leaves the exhaust lean, whereby the injected fuel combusts to generate heat. After warm up, the fuel injection rate is increased and or the oxygen flow rate reduced to provide a rich exhaust.

Designing the fuel reformer to heat and operate at least partially through steam reforming reactions as in the '037 publication as opposed to operating at typical diesel exhaust temperatures as in the '296 publication reduces the catalyst requirement, increases reformate (CO and $H_2$) yield, and reduces the amount of waste heat. In principal, if reformate production proceeds through partial oxidation reforming as in the reaction:

$$CH_{1.85} + 0.5O_2 \rightarrow CO + 0.925H_2 \quad (1)$$

1.925 moles of reformate (moles CO plus moles $H_2$) could be obtained from each mole of carbon atoms in the fuel. $CH_{1.85}$ is used to represent diesel fuel having a typical carbon to hydrogen ratio. If reformate production proceeds through steam reforming as in the reaction:

$$CH_{1.85} + H_2O \rightarrow CO + 1.925H_2 \quad (2)$$

2.925 moles of reformate (moles CO plus moles $H_2$) could in principle be obtained from each mole of carbon atoms in the fuel. In practice, yields are lower than theoretical amounts due to the limited efficiency of conversion of fuel, the limited selectivity for reforming reactions over complete combustion reactions, the necessity of producing heat to drive steam reforming, and the loss of energy required to heat the exhaust. Nevertheless, the benefits are sufficient that a low thermal mass reformer that must be preheated is preferred over a large thermal mass reformer that does not require preheating. The fuel expended preheating the fuel reformer is more than compensated by the benefits of steam reforming.

Another advantage of a fuel reformer that heats to steam reforming temperatures for each LNT denitration is that such a reformer is less susceptible to soot build-up. Soot is not only present in the exhaust, but is also a byproduct of fuel reforming. When the fuel reformer is heated, the soot can burn away. This burning can take place during the lean warm-up phase or after the completion of regeneration. Some soot may also be removed by gasification reactions under rich conditions. Soot accumulation can still be a problem, however, if the fuel reformer has cool spots.

The formation of cool spots is a function of the catalysts structure. The structure of a fuel reformer is typically a monolith. Monolith catalysts have become the standard in exhaust aftertreatment. In the early 1970s, when catalytic converters were first introduced by the automobile industry, the catalyst was supported on pellets that were packed into containers. With these packed beds, it was difficult to keep back pressure within engine tolerances. Degradation of the pellets due to vibrations compounded the problem. A pancake shape having a broad frontal area and a shallow bed depth was adapted to reduce back pressure. This shape was difficult to fit under vehicles and it was difficult to maintain a uniform flow across the enlarged cross-section.

Monolith catalysts replaced packed beds for exhaust aftertreatment systems. In a monolith catalyst, the catalytic material is disposed on surfaces in a structured array of longitudinally oriented channels. A honeycomb is a typical monolith structure. The structured orientation of the channels results in a reduced pressure drop in comparison with a packed bed for a given degree of exhaust-catalyst contacting and a given frontal area. The cohesive monolith structure resists degradation better than a packed bed.

Figure 1:
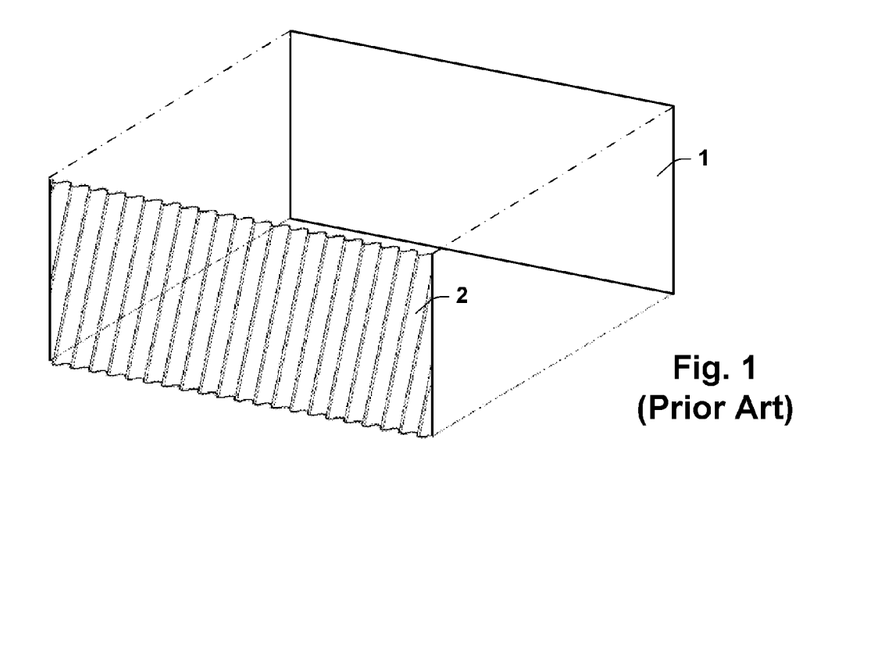
FIG. 1 illustrates a flat foil and a corrugated foil being arranged together in preparation for making a monolith
Figure 2:
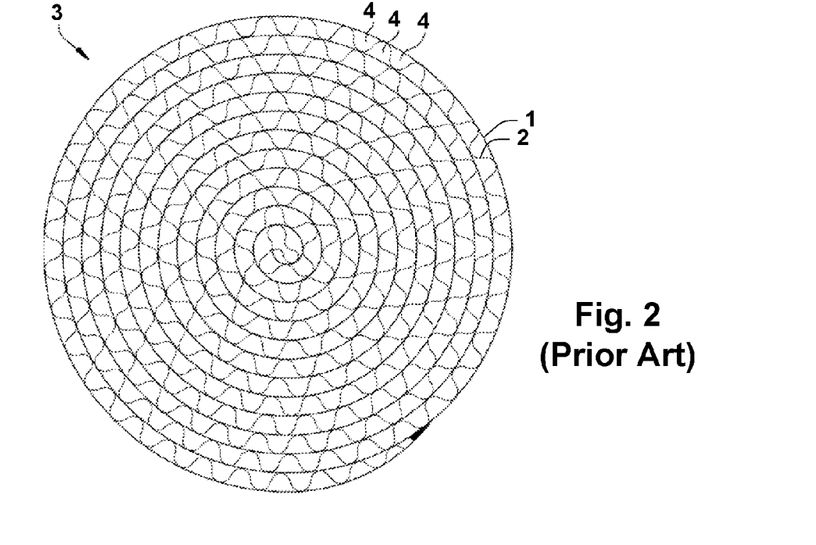
FIG. 2 illustrates a cross-section of a monolith made from the metal foils illustrated by FIG. 1.

Monolith catalyst substrates are generally either ceramic or metallic. Ceramic monoliths can be extruded. Metallic monoliths are formed from metal foils. Typically, at least one of the foils is textured, for example corrugated. Through various combinations of stacking, folding, and/or rolling, the foils can be formed into a monolith structure. FIGS. 1 and 2 provide an example in which a flat foil 1 and a corrugated foil 2 are laid together than rolled to form the monolith 3, which is shown in cross-section.

Monolith-supported exhaust system catalysts have well defined heat and mass transport characteristics. When the catalyst is hot and very active, reaction rates are limited by transport of chemical species from the laminar flow within the channels to the surfaces of the catalyst disposed at the walls of the channels. Mass transport is by diffusion through the relatively stagnant exhaust layers adjacent the channel walls. A single dimensionless coefficient, the Nusselt number, characterizes the transport rates.

Channel densities for monoliths used in exhaust systems are typically in the range from $1 \times 10^1$ to $2 \times 10^2$ per $cm^2$. Packaging consideration place an upper limit on the frontal area of the monolith. The frontal area, which is generally the cross-sectional area for the monolith at any point along its length, is typically in the range from $1 \times 10^1$ to $1 \times 10^3$ per $cm^2$. These parameters assure that flow within the channels is well within the laminar range.

Within a short distance of the entrance of a monolith, the flow profile and the Nusselt number approach asymptotic limits corresponding to fully developed laminar flow. In the limit of fully developed laminar flow, the Nusselt number depends only on channel shape. In the entrance region, where the laminar flow profile is still developing, the Nusselt number can be much higher than the asymptotic limit, which means that transport rates are enhanced.

Figure 3:
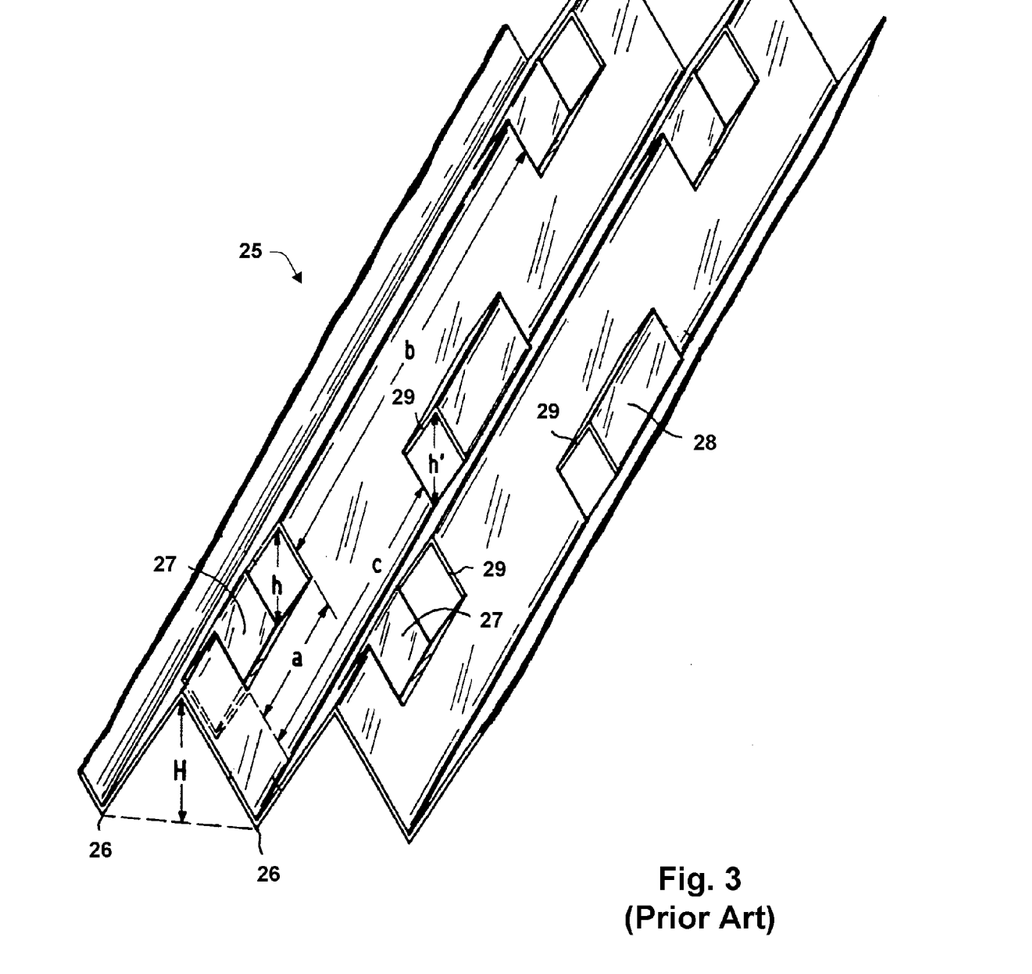
FIG. 3 is an illustration of a monolith structure, abstracted from U.S. Pat. No. 5,045,403.
Figure 4:
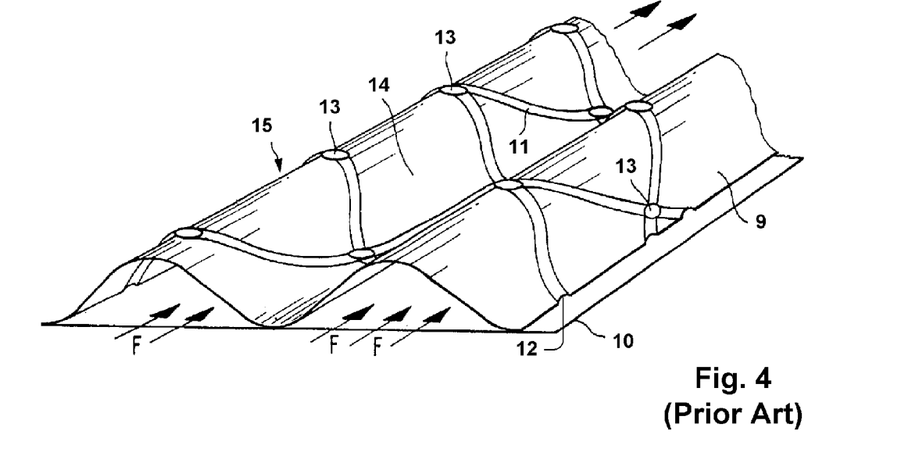
FIG. 4 is an illustration of a monolith structure, abstracted from U.S. Pat. No. 6,316,121.

U.S. Pat. Nos. 5,045,403 (hereinafter the '043 patent) and 6,316,121 (hereinafter the '121 patent) describe modified monolith structures that take advantage of the enhanced Nusselt numbers of a developing flow. These patents described monoliths channels that are modified by secondary structures. FIG. 4 provides an example from the '121 patent. The structure 15 has a primary structure 14, which defines flow channels. Secondary structures 11, the shapes of which are most easily appreciated at their ends 12, intrude on the channels defined by the primary structure, causing the flow to change shape and redevelop periodically through the monolith length. FIG. 3 provides an exemplary structure 25 from the '403 patent. Corrugations 26 provide the primary structure. Secondary structures in the form of peaks 27 and valleys 28 intrude into the channels formed by the primary structure. These secondary structures provide internal leading edges 29. All secondary structure provide locally enhanced Nusselt numbers, but internal leading edges force particularly sudden and sharp changes to the flow profile and particularly high Nusselt numbers. In each case, the secondary structures redirect the exhaust flow periodically through the monolith lengths, creating entrance type conditions through the monolith interiors.

Nusselt numbers are made dimensionless using a ratio of parameters, one of which is a local transport rate coefficient and another of which characterizes the channel size. Reducing channel sizes does not alter the Nusselt numbers, but provides another way to increase transport rates. Reducing channels sizes generally involves increasing the number of channels so as to maintain the frontal area and also decreasing the monolith length to keep the total surface area and catalyst amount the same. In spite of shorter length, reduced channel sizes increase back pressure. Secondary structures like internal leading edges also increases back pressure. In both cases increasing mass transport rates comes at the cost of increasing back pressure. It is unclear whether introducing the internal leading edges provides a better tradeoff than reducing channel sizes. Manufacturing considerations and material limits may ultimately drive choices.

In spite of advances, there continues to be a long felt need for an affordable and reliable diesel exhaust aftertreatment system that is durable, has a manageable operating cost (including fuel requirement), and reduces $NO_X$ emissions to a satisfactory extent in the sense of meeting U.S. Environmental Protection Agency (EPA) regulations effective in 2010 and other such regulations that limit $NO_X$ emissions from trucks and other diesel-powered vehicles.

SUMMARY

A modified monolith having periodically spaced internal leading edges makes for a high efficiency exhaust line fuel reformer within the class of fuel reformers designed for rapid heating and steam reforming, but can be susceptible to soot accumulation. The inventors have found that a hybrid substrate combining a conventional monolith substrate upstream and a modified monolith substrate downstream provides both high efficiency and soot resistance.

One aspect of the invention is a diesel exhaust aftertreatment system comprising a fuel reformer having serially arranged first and second catalyst supports. The first support is upstream and the second support is downstream. The first support has a monolith structure with lengthwise uniformity such that exhaust flow beyond an entrance region is essentially a fully developed laminar flow. The second support has a modified monolith structure having a multiplicity of internal leading edges periodically spaced through its length with a frequency less than two times the hydrodynamic entry length. The frequency of these leading edges is preferably less than the hydrodynamic entry length at a peak flow condition, meaning that a fully developed laminar flow never occurs with the secondary structure at the peak flow condition. The first support has a catalyst coating comprising at least an oxidation catalyst. The second support has a catalyst coating comprising at least a steam reforming catalyst. The exhaust aftertreatment system comprises one or more additional catalysts downstream from the fuel reformer, such as an LNT and a diesel particulate filter. The fuel reformer functions to reform diesel fuel within the exhaust stream by partial oxidation and steam reforming reactions and is resist to becoming clogged by soot. The reformate can be used to regenerate the LNT.

Another aspect of the invention is a diesel exhaust aftertreatment system comprising an exhaust conduit having an upstream inlet and a downstream outlet and a fuel reformer positioned within the conduit between the inlet and the outlet. The fuel reform comprises one or more catalyst supports the catalyst supports having distinct first and second catalyst support structures, the first support structure being manifest nearer the inlet than the second support structure. There is a first catalyst coating comprising at least an oxidation catalyst over a portion of the support having the first catalyst structure. There is a second catalyst coating comprising at least a steam reforming catalyst over a different portion of the support having the second catalyst structure. The first support structure defines a first structured array of exhaust flow channels having a first mean flow direction and a first hydraulic diameter. The cross-section of the first support structure perpendicular to the first primary flow direction is uniform over a length along the first mean flow direction that is at least ten times the first hydraulic diameter. The second support structure defines a second structured array of exhaust flow channels having a second mean flow direction and a second hydraulic diameter. The cross-section of the second support structure in a plane perpendicular to the second primary flow direction varies repeatedly along the second mean flow direction with a period of repetition less than ten times the second hydraulic diameter.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

Figure 5:
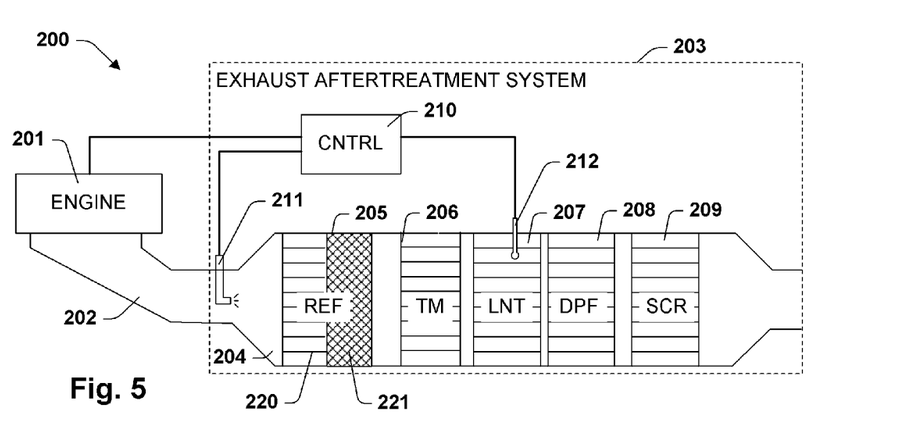
FIG. 5 is a schematic illustration of a power generation system according to the present invention, suitable for powering a vehicle.

FIG. 5 is a schematic illustration of a preferred power generation system 200 comprising a diesel exhaust aftertreatment system 203 according to the present invention. The exemplary power generation system 200 can be installed in a vehicle or in a stationary power plant, such as a back-up generator for a hospital. While the invention may be described and claimed in terms of power generation systems, it should be appreciated that the full value of the invention may be realized in a larger system, such as vehicle. For example, the invention extends the period over which a vehicle can operate within the confines of emission control regulations without requiring replacement of any aftertreatment system components. This can be critical in meeting regulatory and customer requirements.

The exemplary power generation system 200 comprises an engine 201, a manifold 202, and the exhaust aftertreatment system 203. The exhaust aftertreatment system 203 comprises an exhaust line 204 configured to channel exhaust from the manifold 202 through, in order, a fuel reformer 205, a thermal mass 206, an LNT 207, a DPF 208, and an SCR catalyst 209. A fuel injector 211 is configured to inject fuel into the exhaust line 204 upstream from the fuel reformer 205 at times and at rates determined by a controller 210. Implementation of the present invention does not require either the thermal mass 206, the DPF 208, the LNT 207, or the SCR catalyst 209. The invention relates primarily to the fuel reformer 205, although the other devices provide a context in which the invention is relevant: a soot containing exhaust, a reformer that operates at steam reforming temperatures, and an operating cycle in which soot buildup within the reformer 205 would be problematic if a conventional monolith substrate were used.

The substrate 220 for the upstream portion of the fuel reformer 205 has a cross-section that is uniform through its length. Uniform in this context means unvarying in size or shape. The cross-section may vary through its length by a smooth rotation while still being uniform. This is illustrated by the example of FIGS. 1 and 2. FIG. 1 shows a corrugated foil 2 and a flat foil 1 being laid together. They are rolled together to form the monolith 3 of FIG. 2. If the axis of the roll were aligned with the corrugations 31, the monolith would have straight channels. Straight channeled monoliths are the usual type. FIG. 1 show the foils being aligned in such a way that the axis of the roll will be angled with respect to the corrugations 31. This causes the channels 32 to spiral gently through the monolith length. Although such channels are not straight, the local value of the Nusselt number within a given channel 32 of the monolith 3 approaches an asymptotic limit shortly beyond the channel entrance. This is the feature sought after for the substrate 220. More preferably, the channels of the substrate 220 are straight. Monoliths with lengthwise uniformity, especially those with straight channels, are more soot resistant than monoliths with non-uniform channels.

There are two mechanisms by which uniform and straight channel structures enhances soot resistance. One is that soot particles traveling in the gas stream have little or no momentum driving them toward the substrate walls. This is in contrast to a monolith with rapidly changing cross-section, and especially a monolith with internal leading edges. A second mechanism is that uniform and straight channel monolith structures provide lower Nusselt numbers, meaning lower heat and mass transport rates between the gas and the substrate walls.

Heat and mass transport occur by analogous mechanisms. For that reason, structures that enhance mass transport also enhance heat transport. If transport rates are very high, the catalyst and the gas remain at nearly equal temperature. If transport rates are low, exothermic reactions can cause the substrate to become much hotter than the gas. This is particularly important near the entrance. If transport rates are high, the catalyst near the entrance remains at nearly the same temperature as the entering gas, which can be much less than the outlet gas temperature. If transport rates near the entrance are low, the catalyst near the entrance can obtain temperatures near that of the gas at the outlet.

In the case of the reformer 205, the uniform structure of the upstream substrate 220 provides lower transport rates than the structure of the downstream substrate 221. That difference in structure leads to higher catalyst temperatures in the upstream region and high conversion efficiency in the downstream region. The higher temperatures cause soot to burn off before it can accumulate excessively. This mechanism can be enhanced by providing the upstream substrate 220 with a larger hydraulic diameter than the downstream substrate 221.

The hydraulic diameter is a way of characterizing channel sizes. The hydraulic diameter is defined as four times the open volume within the support divided by the gross surface area of the support. The gross surface area is a surface area calculated excluding contributions from micro-porosity, surface texturing, or the like. For channels having circular cross-section, this definition makes the hydraulic diameter the same as the channel diameter. Providing the upstream substrate 220 with an increased hydraulic diameter means providing it with larger channels. Larger channels are more resistant to clogging by soot, although larger channels have disadvantages such a lower transport rates, less effective use of space, and in some cases less efficient catalyst utilization. In one of the preferred embodiments, the upstream substrate 220 has a larger hydraulic diameter than the downstream substrate 221. The downstream substrate does not benefit from large channels since the exhaust is generally heated before it reaches the downstream area.

While larger diameter channels are preferred for the upstream substrate 220, there is another embodiment in which the hydraulic diameters of the two regions are approximately the same. This embodiment arises from the concept of forming both the upstream substrate 220 and the downstream substrate 221 from one set of metal foils. The patterning of at least one of the foils is different between the areas that form the upstream substrate 220 and the downstream substrate 221. The advantages of this embodiment include ease of construction and assembly, and better transport of heat between the upstream and the downstream substrates. Transport of heat from the upstream substrate 220 to the downstream substrate 221 can accelerate the warm-up process and soot burn-off. Transport of heat from the downstream substrate 221 to the upstream substrate 220 can increase the maximum temperature reached by the upstream substrate 221 over the course of a regeneration and thereby improve soot burn-off.

It should be appreciated from the foregoing discussion that the upstream substrate 220 and the downstream substrate 221 need not be separate or physically distinct except in terms of channel structure. If the upstream substrate 220 and the downstream substrate 221 are physically separate, it is preferred that they abut to enhance heat transport and avoid wasting space.

The substrate 221 has a modified monolith structure. Like a conventional monolith, it has channels that are not random, but are structured into an array pattern. The individual channels, however, are not uniform in cross-section through their length. The channel profiles change periodically with respect to length. The changes in profile cause the flow to redistribute as it would in an entrance region. The redistribution of flow entails flow perpendicular to the channel walls and enhanced Nusselt numbers in comparison to fully developed laminar flow.

The channel profile within the substrate 221 change in a pattern that repeats periodically in the mean direction of flow defined by the substrate 221. The profile may change continuously or in a step-wise fashion. The period of repetition is preferably less than two times the hydrodynamic entry length for channels of equivalent but unchanging profile. This limit assures that the average Nusselt number through the lengths of the channels is significantly enhanced by the changing profile. More preferably, the period of repetition is sufficiently frequent that a fully developed laminar flow does not occur anywhere within the volume of the second substrate.

The hydrodynamic entry length is the distance required for a flow to become an essentially fully developed laminar flow. An essentially fully developed laminar flow is one that would be considered fully developed. While there is more than one way to define a fully developed laminar flow, the differences in hydrodynamic entry length resulting from the variation among the accepted definitions are minor. To fix the idea, the flow may be considered fully developed when the velocity at each position through a cross-section is within 5% of the asymptotic limit for a uniform channel having the same cross-section.

The hydrodynamic entry length depends on the exhaust flow velocity. For purposes of this description, the velocity to use is a peak flow capacity for which the system is designed. A peak flow capacity may be included in the aftertreatment system specification. In the absence of a clearly rated limit, the peak flow capacity can be considered the flow rate at which the system generates a backpressure of 0.3 atm or $3 \times 10^4$ Pa with the exhaust at 500° C. The limit of two times the hydrodynamic entry length typically entails that the profile changes with a pattern that repeats every 10 hydraulic diameters or less.

The downstream substrate 221 may be a conventional monolith structure with channels modified by a secondary structure. FIGS. 3 and 4 provides examples of monoliths channel structures 15 and 25 with secondary structures superimposed. The primary channel structure of FIG. 4 is formed by a flat foil 10 and a corrugated foil 9, the large corrugations 14 defines the primary channel shape and the hydraulic diameter. The secondary structure 12 is on a smaller scale, but is of sufficient height to perturb the exhaust flow from its principle, net, and average direction, which is parallel to the corrugations 14. The areas 13 are cutouts, but the holes are filled by flat foils of the adjacent layers. They do not provide internal leading edges.

The structure 25 on the other hand has internal leading edges 29. These are formed by a secondary structure, which consists of peaks 28 and troughs 27. The heights h and h' of these secondary features are less than the channel height H, preferably ⅓ the channel height or less. The period of repetition for these secondary features (a+b) is preferably less than the hydrodynamic entry length and is typically less than 5 times the hydraulic diameter of the channels. The internal leading edges 29 create steep gradients in the local velocity and large increases in the local Nusselt numbers.

The structures 221 and 222 define mean flow directions. In general, the secondary structures do not alter the mean flow direction, which is the direction of flow within each of the structures at steady state averaged over the volume within the perimeters of the volumes enclosed by the structures. In a monolith having straight channels, the flow at any point beyond the entrance region is essentially in the mean direction. The term essentially in this context accommodates small flows such as the net flow caused by reactions that increase or decrease the number of moles of gas as the gas passes through the reformer 205. The secondary structures within the monolith 222 force flow in directions that are perpendicular to the mean flow direction.

The system 200 provides an exemplary environment of use for the diesel fuel reformer 205. Operation of the fuel reformer 205 is managed by the controller 210. The controller 210 may be a control unit for the engine 201 or a separate control unit. If separate, the controller 210 preferably communicates with the engine control unit. The controller 210 receives data from various sensors, such as a temperature sensor 212. The sensor 212 is configured to sense a characteristic temperature for the LNT 207. Other sensors that may be provided include, without limitation, a temperature sensor for the fuel reformer 205 and one or more exhaust composition sensors that can be used to monitor performance of the LNT 207. Usually there will be at least one composition sensor downstream from the LNT 207, such as a $NO_X$ sensor. Suitable locations include locations upstream and downstream from the SCR catalyst 209.

The engine 201 can be any engine that operates to produce a lean exhaust stream comprising $NO_X$ and $SO_X$. Generally the engine 201 is a diesel-fueled compression ignition internal combustion engine that produces an exhaust containing from 2 to 20% oxygen. The diesel exhaust is typically at temperatures in the range from about 200 to about 500° C., with temperatures in the range from 250 to 450° C. beginning common. The manifold 202 couples the exhaust aftertreatment system 203 to an exhaust stream from the engine 201. Preferably the exhaust system 203 comprises a single exhaust line 204 that receives the entire exhaust from the engine 201.

The exhaust aftertreatment system 203 and the exhaust line 204 preferably have no valves or dampers that control the flow of exhaust. Exhaust system valves and dampers provide control over the distribution of exhaust between a plurality of flow paths. Such control is desirable in terms of limiting fuel usage. Reducing the flow of exhaust to the fuel reformer 205 and the LNT 207 during rich regeneration would reduce the amount of fuel expended eliminating oxygen from the exhaust in order to provide rich conditions. The reduced flow rate would also increase residence times, and thus the efficiency with which reductants are used. Nevertheless, it is preferred that the exhaust treatment system 203 operate without exhaust line valves or dampers in order to avoid failures resulting from reliance on such devices.

The LNT 207 is a device that adsorbs $NO_X$ under lean conditions and reduces $NO_X$ releasing the reduction products ($N_2$ and $NH_3$) under rich conditions. Some alternate terms for a lean $NO_X$ trap (LNT) are $NO_X$ absorber-catalyst and $NO_X$ trap-catalyst. An LNT generally comprises a $NO_X$ absorbent and a precious metal catalyst in intimate contact on an inert support. Examples of $NO_X$ adsorbent materials include certain oxides, carbonates, and hydroxides of alkaline earth metals such as Mg, Ca, Sr, and Ba or alkali metals such as K or Cs. The adsorption can be physical or chemical, but is generally primarily chemical. The precious metal typically comprises one or more of Pt, Pd, and Rh. The support is typically a monolith, although other support structures can be used. The monolith support is typically ceramic, although other materials such as metal and SiC are also suitable for LNT supports. The LNT 207 may be provided as two or more separate bricks.

The fuel reformer 205 and the fuel injector 211 are part of a system for producing the rich conditions and providing the reductant required for denitration and desulfation. A reductant is a compound that is reactive to accept oxygen and become oxidized. A rich condition for the exhaust is one in which the concentration of reductants is more than stoichiometric for combustion with any oxygen and other oxidizing compounds present. In other words, a rich environment is one in which there is an excess of reductant and the overall composition is reducing rather than oxidizing.

Optionally, the engine 201 is used to assist in producing rich conditions. If the engine 201 can be operated with rich combustion or with post-combustion fuel injection, than the engine 201 can provide a rich mixture and the exhaust line fuel injector 211 is optional. The engine 201 can also facilitate generating rich conditions by measures that reduce the exhaust oxygen flow rate. Such measures may include, for example, throttling an air intake for the engine 201, increasing exhaust gas recirculation (EGR), modifying cylinder injection controls, and shifting gears to reduce the engine speed.

It is preferable for the aftertreatment 203 to be capable of providing the rich conditions for denitration and desulfation of the LNT 207 while making few or no changes to the operation of the engine 201 in order to avoid having regenerations (denitrations and desulfations) adversely affect drivability and also to provide greater independence between the designs and configurations of the aftertreatment system 203 and the engine 201. It would not be unusual for the engine 201 to be manufactured by one company while the power generation system 200 comprising the engine 201 is assembled by another company. A third company may build a vehicle using the assembled power generation system 200.

The fuel reformer 205 is a device that is functional and adapted to reform diesel fuel into reformate, especially CO and $H_2$. Reformate is a better reductant than diesel fuel for denitrating the LNT 207. Reformate is more reactive than diesel fuel and results in less $NO_X$ slip. $NO_X$ slip is the release of unreduced $NO_X$ from the LNT 207 during denitration.

Preferably, the fuel reformer 205 has a low thermal mass. A low thermal mass allows the fuel reformer 205 to be heated to steam reforming temperatures for each denitration without requiring an excessive amount of time or fuel. Steam reforming temperatures have a minimum in the range from about 500° C. to about 600° C., typically requiring at least 550° C. At steam reforming temperatures, energy from oxidation and partial oxidation, which are exothermic, can drive steam reforming, which is endothermic. This improves the efficiency with which reformate is produced and decreasing the amount of waste heat. A sufficiently low thermal mass can be achieved by constructing the substrates 220 and 221 of the fuel reformer 205 with thin metal foils, i.e., 130 microns or less. Preferably the foils are 100 microns or less, and more preferably 50 microns or less. The preferred structure can be heated from a typical diesel exhaust temperature in the range from 250 to 300° C. to steam reforming temperatures in 2 or 3 seconds or less.

The substrates 220 and 221 have catalysts washcoats that support oxidation and steam reforming catalysts. The washcoat of the upstream substrate 220 comprises at least an oxidation catalyst. The washcoat of the downstream substrate 221 comprises at least a steam reforming catalyst. One washcoat comprising both types of catalysts can be applied to both substrates, but preferably these are different washcoats. The reforming catalysts is particularly expensive and is preferably applied to the downstream substrate 221 only. Oxidation over the upstream catalyst on the upstream substrate provides heat to sustain steam reforming over the downstream catalysts.

Preferred oxidation catalysts are Pd and or Pt. A preferred reforming catalyst is Rh. The catalysts washcoats are preferably La stabilized refractory metal oxides. A preferred refractory metal oxide for the oxidation catalyst is alumina. A preferred refractory metal oxide for the reforming catalyst is $ZrO_2$.

The exhaust from the engine 201 generally comprises at least 2% oxygen. When fuel is added to the exhaust to produce a rich condition for denitration or desulfation, this oxygen is eliminated by combustion. In the system 200, this combustion takes place in the fuel reformer 205. The heat is preferably held temporarily upstream from the LNT 207 to be released only slowly over a prolonged period. In the preferred design, the fuel reformer 205 has a low thermal mass (thermal inertia) and is not very effective for holding heat. In the system 200, the thermal mass 206 provides the desired heat retention function.

The thermal mass 206 is any device that is effective for exchanging heat with the exhaust and storing the heat produced by the fuel reformer 205 over the course of a denitration without heating excessively. A suitable device can be simply a catalyst substrate, with or without a catalyst. A suitable device is, for example, an inert monolith substrate, either metal or ceramic. Preferably, the thermal mass 206 has a thermal inertia that is greater than that of the fuel reformer 205. The DPF 208 can be used as the thermal mass 206, although in the exemplary system 200, the DPF is downstream from the LNT 208 and instead serves to help protect the SCR catalyst 209 from high temperatures during desulfations. Protection of the SCR catalyst 209 may also be facilitated by a Venturi positioned between the DPF 208 and the SCR catalyst 209. Such a Venturi also improves the function of the SCR catalyst 209 by maintaining lean condition over that catalyst even during rich operation of the reformer 205.

The DPF 208 and the SCR catalyst 209 contribute to meeting emission control limits and durability requirements. The DPF 208 removes particulate matter from the exhaust, which is the major pollutant in diesel exhaust other than $NO_X$. The SCR catalyst 209 provides supplementary $NO_X$ mitigation. It improves durability by allowing sufficient $NO_X$ mitigation to be maintained with less frequent denitration and desulfation of the LNT 208. When some $NO_X$ is reduced downstream from the LNT 207, the LNT 207 does not need to be maintained at as high a level of efficiency.

A DPF is a device that traps particulates matter (soot), removing it from the exhaust flow. The DPF 208 can be a wall flow filter, which uses primarily cake filtration, or a flow-through filter, which uses primarily deep-bed filtration. The DPF 208 can have any suitable structure. Examples of suitable structures include monoliths. A monolith wall flow filter is typically made from a ceramic such as cordierite or SiC, with alternating channels blocked at each end to force the flow through the walls. A flow-through filter can be made from metal foil.

Trapped soot can be removed from the DPF 208 continuously by catalyzing reactions between soot and $NO_X$, but typically the DPF 208 must be heated from time-to-time to a temperature at which it regenerates by combustion of trapped soot. The temperature required for soot combustion can be reduced by a catalyst. Suitable catalysts include precious metals and oxides of Ce, Zr, La, Y, and Nd. Soot combustion is exothermic and can be self-sustaining once ignited.

The SCR catalyst 209 is an ammonia-SCR catalyst functional to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, exchanged with metal ions such as cations of Cu, Co, Ag, Zn, or Pt.

The engine 201 operates to produce a lean exhaust comprising $NO_X$, particulate matter, and $SO_X$. The expression $NO_X$ designates the family of molecules consisting of nitrogen and oxygen atoms, primarily NO and $NO_2$. The subscript X indicates the family includes multiple species with varying proportions between nitrogen and oxygen atoms. The notation $SO_X$ is similar.

Under lean conditions, the LNT 207 absorbs a portion of the $NO_X$ and a portion of the $SO_X$ in the exhaust. If the SCR catalyst 209 contains stored ammonia, an additional portion of the $NO_X$ is reduced therein. The DPF 208 removes at least a portion of the particular matter from the exhaust.

From time-to-time, the controller 210 determines to denitrate the LNT 207. For denitration, the fuel reformer 205 is heated to steam reforming temperatures by injecting fuel into the exhaust line 204 through the fuel injector 211 under the control of the controller 210 at rates that leave the exhaust lean. Under lean condition, most of the injected fuel combusts in the fuel reformer 205, heating it. Most of the combustion takes place over the upstream substrate 220. After the fuel reformer 205 has reached steam reforming temperatures, as may be determined using a temperature sensor, the fuel injection rate is controlled to make the exhaust condition rich for a period of time (rich phase) over which the LNT 207 denitrates. Combustion also occurs under rich conditions, again mostly over the upstream substrate 220.

During the rich phase, injected fuel mixed with lean exhaust enters the fuel reformer 205. A portion of the fuel combusts, consuming most of the oxygen from the exhaust. Another portion of the fuel is converted to reformate (syn gas), which is primarily $H_2$ and CO. The reformate enters the LNT 207 where it reacts to reduce and release trapped $NO_X$. Most of the $NO_X$ released during the rich phase is reduced to $N_2$ or $NH_3$, although it is typical for a small amount to be released (slip) without being reduced. The $NH_3$ is mostly trapped by the SCR 209, where it is generally consumed reducing $NO_X$ over the course of the following lean phase.

$NO_X$ slip occurs primarily at the beginning of the rich phase and may be lessened by varying the reductant concentration over the course of the denitration. The preferred reductant concentration profile has the reductant concentration relatively low at the start of the rich phase and gradually increasing over at least a first portion of the rich phase.

When the fuel reformer 205 heats for denitration, the thermal mass 206 also heats, but to a lesser degree. After denitration is complete, fuel injection ceases and the fuel reformer 205 cools down to exhaust temperatures. The thermal mass 206 also cools. The LNT 207 will heat over the course of the denitration and a short period following, but only to a modest degree.

From time-to-time, the LNT 207 must be heated substantially in order to carry out a desulfation. In the system 200, the LNT 207 can be heated by injecting fuel into the exhaust. The injected fuel combusts, primarily in the fuel reformer 205. Over the course of a few minutes, the thermal inertias of the thermal mass 206 and of the LNT 207 are overcome and the LNT 207 reaches desulfating temperatures. Alternative and supplemental means of heating the LNT 207 include, without limitation, engine measures, such as operating the engine to produce a hot exhaust, burners, and electrical heaters.

In the system 200, after the LNT 207 has reached desulfating temperatures, the fuel injection rate is controlled to make the exhaust rich. It might be considered ideal to maintain the rich condition until the LNT 207 has desulfated to a desired degree. In the system 200, however, it proves difficult to continuously maintain rich conditions while also maintaining the fuel reformer 205 and the LNT 207 within desired temperature ranges. In general, it is necessary to pulse the fuel injection over the course of a desulfation. Pulsed fueling may enhance soot formation in the fuel reformer 205 absent the inventive hybrid structure including substrate 220 and 221.

In the context of maintaining the desired conditions for desulfation, pulsing the fuel injection means creating alternating rich and lean phases (periods). During the rich phases, the reformer 205 heats and produces reformate. During the lean phase, fuel injection ceases and the fuel reformer 205 cools. Typically, the durations of the rich phases are in the range from about 4 to about 30 seconds, with periods in the range from about 5 to about 15 seconds being preferred.

When lean and rich phases are alternated in this manner, some combustion takes place in the LNT 207. The LNT 207 typically comprises oxygen storage materials, which are materials that are functional to store oxygen. These materials accumulate oxygen during the lean phases, typically to the point of saturation. During the rich phases, the reductants react with the stored oxygen, consuming the stored oxygen and producing heat. The amount of heat can be significant, e.g., enough to make the LNT 207 50° C. to 100° C. hotter than the fuel reformer 205. The amount of this heating is generally proportional to the oxygen storage capacity of the LNT 207 and to the frequency of switches between lean and rich phases.

In a preferred embodiment, the fuel injection rate is selected to provide a desired reformate production rate or concentration while the temperatures of the fuel reformer 205 and the LNT 207 are controlled by varying two parameters that dictate the lean-rich pulse pattern. The lean rich pulse pattern consists of the lean phase lengths and the rich phase lengths or two other parameters that define these, such as the pulse frequency and the ratio between lean time and rich time.

In one exemplary control strategy, the rich phases are terminated when the fuel reformer 205 reaches a pre-defined upper limit temperature, such as 650° C. The lean phase durations are then adjusted in a closed loop control algorithm to maintain the temperature of the LNT 207 within the desired temperature range. In a variation of this method, the adjusted parameter is a temperature to which the fuel reformer 205 is required to cool before terminating. The LNT temperature target by control is preferably a maximum temperature that the LNT reaches over the course of a lean-rich cycle, but could alternatively be another temperature, such as an average temperature. Making the pulse periods shorter by reducing the durations of the lean phases raises temperatures within the LNT 207. The temperatures rise because the fuel reformer 205 is on average hotter resulting in more heat convection to the LNT 207 and because the more frequent alternation between lean and rich phases results in more combustion within the LNT 207. Conversely, lengthening the lean phases lowers temperatures within the LNT 207.

In another exemplary control strategy, the durations of the rich phases are predetermined and both the upper and lower temperatures of the fuel reformer 205 (or two equivalent parameters) are set in order to achieve the desired rich phase length while maintaining the LNT 207 at the desired temperature. In this example, the temperature to which the fuel reformer 205 falls during a lean phase is raised or lowered to raise or lower the temperature of the LNT 207. During the rich phases, the reformer heats by an amount that depends on the predetermined rich phase duration. By selecting the rich phase duration within suitable limits, the fuel reformer 205 can be prevented from either overheating or cooling excessively, e.g., cooling below steam reforming temperatures. Preselecting the rich phase duration can be beneficial in managing hydrocarbon emissions during desulfations. In terms of limiting hydrocarbon emissions, a suitable length for the rich phases is on the order 10 to 20 seconds for a fresh catalyst, decreasing to about 50-70% as much as the catalyst ages.

It is generally also necessary to regenerate the DPF 208 from time-to-time. Regenerating the DPF 208 comprises heating the DPF 208 to temperatures at which soot trapped with the DPF 208 combusts. The DPF 208 can be heated in the same way as the LNT 207 is heated for desulfation. Once the DPF 208 is heated to soot combustion temperatures, it may or may not be necessary to supply any additional heat to sustain soot combustion.

The DPF 208 is typically of the wall flow filter variety and must be regenerated often enough to avoid excessive back pressure. Ideally, regenerating the DPF 208 each time the LNT 207 is regenerated provides sufficient frequency. The DPF 208 is heated to soot combustion temperatures each time the LNT 207 is heated for desulfation. If the DPF 208 has sufficient capacity to require regeneration no more often than the LNT 207 is regenerated, supplemental fuel expenditure and additional heating of the LNT 207 for the sole purpose of regenerating the DPF 208 can be avoided.

One approach that can facilitate not having to regenerate the DPF 208 more often than the LNT 207 is desulfated is to provide a second DPF downstream from the fuel reformer 205 and upstream from the LNT 207. This second DPF can be used as the thermal mass 206, but is preferably a low thermal mass device upstream from the thermal mass 208. Preferably, this second DPF is of the flow-through type. Preferably, its thermal mass is sufficiently low that it heats and regenerates each time the fuel reformer 205 is heated to supply reformate for denitration. Accordingly, in this embodiment, there is a second DPF that regenerates as often as the LNT 207 is denitrated.

The times at which the LNT 207 is denitrated are determined by the controller 210 and can be determined in any suitable manner. Typically, certain thresholds must be met before allowing a denitration to begin. Threshold criteria can be, for example, one or both the LNT 207 and the fuel reformer 205 being at minimum temperatures, the oxygen concentration being below a maximum (e.g., less than 15%), the flow rate being above a minimum (e.g., significantly greater than at idle), the engine speed variance, as determined by a moving average, being below a maximum, at a minimum time elapsed since the last denitration, and a gear shift not currently imminent or in progress. If the threshold criteria are met, regeneration will begin if an additional condition (or conditions) are met. An additional condition generally relates to a measure of how urgently denitration is needed and is optionally weighed against the suitability of current conditions for beginning a denitration.

The urgency of the need to denitrate generally relates to one or more of $NO_X$ loading of the LNT 207, remaining $NO_X$ storage capacity, $NO_X$ trapping efficiency (optionally normalized for such factors as the LNT temperature and exhaust flow rate), $NO_X$ concentration in the exhaust at a point downstream from the LNT 207, and cumulative $NO_X$ emissions since the last denitration (optionally normalized by the engine's toque production). A measure of suitability can relate to one or more of such factors as the exhaust oxygen concentration (low is preferred), the engine speed variance (low is preferred), and the exhaust flow rate. One procedure for weighing the urgency of the need to denitrate against the suitability of current conditions to denitration is to assign numerical values to the urgency and the conduciveness, multiplying the two together, and denitrating based on whether the result exceeds a predetermined critical value.

Likewise, the times at which the LNT 207 is desulfated are determined by the controller 210 in any suitable manner. Threshold criteria may be employed similar to those used for denitration and a measure of suitability of current conditions to desulfation can be weighed against a measure of the urgency of the need for desulfation. The urgency of the need to desulfated can be based on, for example, one or more of an estimate of the amount sulfur trapped in the LNT, the frequency with which denitration is being required, an estimate of the post-denitration $NO_X$ storage capacity of the LNT 207, the amount of time since the last desulfation, the number of denitrations since the last desulfation, and an estimate of the average LNT efficiency following the last desulfation, or over the last several desulfations. The LNT efficiency can be normalized to separate changes intrinsic to the LNT 207 from changes in the operating regime of the engine 201. Alternatively, normalization can be limited, whereby less sulfur loading is tolerated when the engine is in an operating regime that requires peak LNT efficiency, e.g., when the engine 201 is in a high speed-high load condition. Preferably, the determinations of when to desulfate the LNT 207 include a dynamic measure of LNT performance, whereby adjustments to the desulfation timing and the desulfating conditions can be adapted to measurable indications of aging.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A diesel exhaust aftertreatment system, comprising:
   an exhaust conduit having an upstream inlet and a downstream outlet;
   a fuel reformer within the conduit, the fuel reform comprising serially arranged first and second catalyst supports, the first support being nearer the inlet;
   wherein the first support has a monolith structure that is uniform lengthwise;
   the second support has a modified monolith structure providing a multiplicity of internal leading edges periodically spaced through its length;
   the first support has a catalyst coating comprising at least an oxidation catalyst; and
   the second support has a catalyst coating comprising at least a steam reforming catalyst.

2. The diesel exhaust aftertreatment system of claim 1, wherein
   the exhaust aftertreatment system has a peak flow capacity;
   the uniform structure of the first support causes a fully developed laminar flow to form within its channels when the exhaust flow is at the peak of the system's capacity; and
   the modified structure of the second support prevents a fully developed laminar flow from forming within its channels when the exhaust flow is at the peak of the system's capacity.

3. The diesel exhaust aftertreatment system of claim 1, further comprising
   a lean $NO_X$ trap positioned within the conduit downstream from the fuel reformer; and
   a diesel particulate filter positioned within the conduit, downstream from the fuel reformer.

4. The diesel exhaust aftertreatment system of claim 1, wherein the fuel reformer has a peak flow capacity and the modified monolith structure repeats in the direction of flow with a frequency less than two times a hydrodynamic entry length at the peak flow capacity for a straight channel monolith having a cross-section corresponding to a cross-section of the modified monolith structure.

5. The diesel exhaust aftertreatment system of claim 1, wherein the first support structure defines channels that are straight.

6. The diesel exhaust aftertreatment system of claim 1, wherein the second support is a monolith structure defining channels and is modified by a secondary structure providing valleys and troughs with a height below that of the channels.

7. The diesel exhaust aftertreatment system of claim 6, wherein the valleys and troughs a height less than ⅓ that of the channels.

8. The diesel exhaust aftertreatment system of claim 1, wherein the first and second supports are formed by layered metal foils, at least some of which are contiguous between the first and second lengths.

9. The diesel exhaust aftertreatment system of 8, wherein the first and second supports are formed from one set of metal foils, whereby the hydraulic diameters of the first and second support are nearly equal.

10. The diesel exhaust aftertreatment system of claim 1, wherein the first support has a hydraulic diameter substantially greater than that of the second support.

11. A diesel exhaust aftertreatment system, comprising:
- an exhaust conduit having an upstream inlet and a downstream outlet;
- a fuel reformer positioned within the conduit between the inlet and the outlet, the fuel reform comprising one or more catalyst supports the catalysts supports having distinct first and second catalyst support structures, the first support structure being manifest nearer the inlet than the second support structure;
- a first catalyst coating comprising at least an oxidation catalyst over a portion of the support having the first catalyst structure; and
- a second catalyst coating comprising at least a steam reforming catalyst over a portion of the support having the second catalyst structure;
- wherein the first support structure defines a first structured array of exhaust flow channels having a first mean flow direction and a first hydraulic diameter, the cross-section of the first support structure perpendicular to the first mean flow direction being uniform along the first mean flow direction for a length at least ten times the first mean hydraulic diameter; and
- the second support structure defines a second structured array of exhaust flow channels having a second mean flow direction and a second hydraulic diameter, the cross-section of the second support structure perpendicular to the second primary flow direction varying in a repeating pattern along the second mean flow direction with a period of repetition less than ten times the second mean hydraulic diameter.

12. The diesel exhaust aftertreatment system of 11, wherein the cross-section of the second support structure perpendicular to the second primary flow direction provides internal leading edges.

13. The diesel exhaust aftertreatment system of 11, wherein the cross-section of the first support structure is constant along the first flow direction throughout its length, whereby the first support structure provides an exhaust flow that is essentially in one direction throughout once beyond an entrance region where the flow is develops.

14. The diesel exhaust aftertreatment system of 11, wherein exhaust flow channels defined by the second structure have valleys and troughs with a height below that of the channels themselves.

15. The diesel exhaust aftertreatment system of 11, wherein exhaust flow channels defined by the second structure has valleys and troughs with a height less than ⅓ the second hydraulic diameter.

16. The diesel exhaust aftertreatment system of 11, wherein the first and second structures are formed by layered metal foils, at least some of which are contiguous between the first and second lengths.

17. The diesel exhaust aftertreatment system of 16, wherein the first and second structures are formed from one set of metal foils, whereby the first and second hydraulic diameters are nearly equal.

18. The diesel exhaust aftertreatment system of 11, wherein the first hydraulic diameter is substantially greater than the second hydraulic diameter.

19. The diesel exhaust aftertreatment system of 11, further comprising:
- a lean $NO_X$ trap; and
- a diesel particulate filter, both positioned within the exhaust conduit downstream from the fuel reformer.

* * * * *